US007406590B2

(12) United States Patent
Mayer

(10) Patent No.: US 7,406,590 B2
(45) Date of Patent: Jul. 29, 2008

(54) METHODS AND APPARATUS FOR EARLY LOOP BOTTOM DETECTION IN DIGITAL SIGNAL PROCESSORS

(75) Inventor: Christopher M. Mayer, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 272 days.

(21) Appl. No.: 10/786,968

(22) Filed: Feb. 25, 2004

(65) Prior Publication Data

US 2005/0188188 A1    Aug. 25, 2005

(51) Int. Cl.
*G06F 7/38* (2006.01)
*G06F 9/00* (2006.01)
*G06F 9/44* (2006.01)
*G06F 15/00* (2006.01)

(52) U.S. Cl. .................................................. 712/241
(58) Field of Classification Search .................. 712/241
See application file for complete search history.

(56) References Cited

U.S. PATENT DOCUMENTS

| 6,671,799 | B1 | 12/2003 | Parthasarathy |
| 6,748,523 | B1 * | 6/2004 | Singh et al. .................. 712/241 |
| 2002/0078333 | A1 * | 6/2002 | Inoue et al. .................. 712/241 |
| 2005/0102659 | A1 | 5/2005 | Singh et al. |

OTHER PUBLICATIONS

Derived Logic Functions and Gates, May 28, 2003.*

* cited by examiner

*Primary Examiner*—Eddie P Chan
*Assistant Examiner*—Brian P Johnson
(74) *Attorney, Agent, or Firm*—Wolf, Greenfield & Sacks, P.C.

(57) ABSTRACT

Methods and apparatus are provided for processing variable width instructions in a pipelined processor. The apparatus includes an instruction decoder configured to decode a loop setup instruction, having a loop setup instruction address, to obtain a loop bottom offset and configured to decode instructions following the loop setup instruction, each having an instruction address, to obtain an instruction width, registers for holding the loop setup instruction address and the loop bottom offset, and a loop bottom detector, responsive to a current instruction address, a current instruction width, the loop setup instruction address and the loop bottom offset, configured to determine if a next instruction is a loop bottom instruction.

12 Claims, 6 Drawing Sheets

METHODS AND APPARATUS FOR EARLY LOOP BOTTOM DETECTION IN DIGITAL SIGNAL PROCESSORS

FIELD OF THE INVENTION

This invention relates to digital processing systems and, more particularly, to methods and apparatus for early detection of loop bottom instructions in digital processing systems. The methods and apparatus are particularly useful in digital signal processors, but are not limited to such applications and can also be used in general purpose processors.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing, signal processing in wireless systems, and speech recognition. Digital signal processors are typically characterized by real-time operation, high interrupt rates and intensive numeric computations. In addition, digital signal processor applications tend to be intensive in memory access operations and to require the input and output of large quantities of data. Digital signal processor architectures are typically optimized for performing such computations efficiently.

Digital signal processors may include components such as a core processor, a memory, a DMA controller, an external bus interface, and one or more peripheral interfaces on a single chip or substrate. The components of the digital signal processor are interconnected by a bus architecture which produces high performance under desired operating conditions. As used herein, the term "bus" refers to a multiple conductor transmission channel which may be used to carry data of any type (e.g. operands or instructions), addresses and/or control signals. Typically, multiple buses are used to permit the simultaneous transfer of large quantities of data between the components of the digital signal processor. The bus architecture may be configured to provide data to the core processor at a rate sufficient to minimize core processor stalling.

Some processors have hardware loop mechanisms. These mechanisms allow the specification of a program loop, which is a series of instructions that is executed multiple times. The instructions are often referred to by address.

In a variable instruction width processor, instruction width is encoded within several bits of the instruction. Therefore, when executing a series of sequential instructions, the address of a given instruction cannot be determined until the previous instruction has been decoded. The previous instruction address added to the previous instruction width results in the address of the new instruction.

In modern pipelined processors, several cycles are often required to fetch an instruction after the address is known. A cycle after the request to fetch is sent, the address is incremented by a fixed amount and another request is sent to fetch the next sequential block of memory. This describes a typical pipelined fetch unit.

Each cycle, the fetch unit can return a block of memory which contains chunks of instructions. Each block of memory may contain several small instructions, or only a piece of a large instruction. An instruction assembly unit sends the next few pieces of instruction data to the main processor pipeline. As the processor detects the size of the current instruction (by looking at the instruction width bits), it tells the instruction assembly unit how to skip to the next instruction (for the next cycle).

For a processor to detect a program loop, a comparison is made between the current instruction address and the "loop bottom" address. If the addresses are the same, then the instruction is the last in a loop, so the "loop top" address should be sent to fetch. It is desirable to know about the address match early in the fetch pipeline (i.e. as soon as possible after the loop bottom instruction has been sent to the fetch unit) so as to start the loop top fetch as early as possible.

In a variable instruction width processor, it is never possible to know the loop end condition in time to slot the next fetch in the pipeline. Therefore, a structure called a "loop buffer" is commonly used to cache a few instructions at the top of a loop so that they can be injected into the instruction pipeline after a loop bottom is detected but before the fetch for the loop top has completed. (When this loop buffer is engaged, the fetch address requested is not the loop top address, but rather the loop top address plus the width of the instructions in the loop buffer.)

Because the address of the current instruction is not known until it enters the main processor pipeline, no loop comparison can be done until this point. The amount of work to accomplish the loop comparison, compute the next fetch address, and notify the loop buffer to inject instructions takes longer than a cycle. If the loop buffer is not-notified in time, then the processor must stall.

A loop is specified by a "loop setup" instruction, which specifies relative address offsets for the top and bottom of the loop (TOP_OFFSET, BOT_OFFSET) and a loop count. If the address of the loop setup instruction is called "PC_LSETUP", then the address of the loop top is (PC_LSETUP+TOP_OFFSET), and the address of the loop bottom is (PC_LSETUP+BOT_OFFSET).

The instruction directly following the loop setup instruction may be a loop bottom instruction. It can be determined directly from the loop setup instruction decode if this is the case (i.e. if BOT_OFFSET equals the width of the loop setup instruction). No address comparison is required for determining the loop bottom status of the instruction following the loop setup instruction.

However, determining the loop bottom status of the second and later instructions following the loop setup instruction is not as simple. It is desirable to know the result of this computation as soon as possible.

Accordingly, there is a need for improved methods and apparatus for early loop bottom detection in digital processors.

SUMMARY OF THE INVENTION

According to a first aspect of the invention, a method is provided for processing variable width instructions in a pipelined processor. The method comprises decoding instructions to identify a loop setup instruction having a loop setup instruction address and containing a loop bottom offset, decoding instructions following the loop setup instruction, each having an instruction address and containing an instruction width, and, for each instruction following the loop setup instruction, using a current instruction address, a current instruction width, the loop setup instruction address and the loop bottom offset to determine if the next instruction is a loop bottom instruction.

In one embodiment, the step of determining if the next instruction is a loop bottom instruction may comprise determining if the current instruction address plus the current instruction width minus the loop setup instruction address minus the loop bottom offset is equal to zero.

In another embodiment, the step of determining if the next instruction is a loop bottom instruction may comprise determining if the current instruction address plus the current instruction width plus the loop setup instruction address inverted plus the loop bottom offset inverted plus one is equal to negative one.

According to a second aspect of the invention, apparatus is provided for processing variable width instructions in a pipelined processor. The apparatus comprises an instruction decoder configured to decode a loop setup instruction, having a loop setup instruction address, to obtain a loop bottom offset and configured to decode instructions following the loop setup instruction, each having an instruction address, to obtain an instruction width, registers for holding the loop setup instruction address and the loop bottom offset, and a loop bottom detector, responsive to a current instruction address, a current instruction width, a loop setup instruction address and the loop bottom offset, configured to determine if a next instruction is a loop bottom instruction.

The loop bottom detector may comprise a plurality of adders, a plurality of exclusive OR gates receiving outputs of the adders and an AND gate receiving outputs of the exclusive OR gates.

According to another aspect of the invention, apparatus is provided for processing variable width instructions in a pipelined processor. The apparatus comprises means for decoding a loop setup instruction, having a loop setup instruction address, to obtain a loop bottom offset and for decoding instructions following the loop setup instruction, each having an instruction address, to obtain an instruction width, means for holding the loop setup instruction address and the loop bottom offset, and means, responsive to a current instruction address, a current instruction width, the loop setup instruction address and the loop bottom offset, for determining if a next instruction is a loop bottom instruction.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
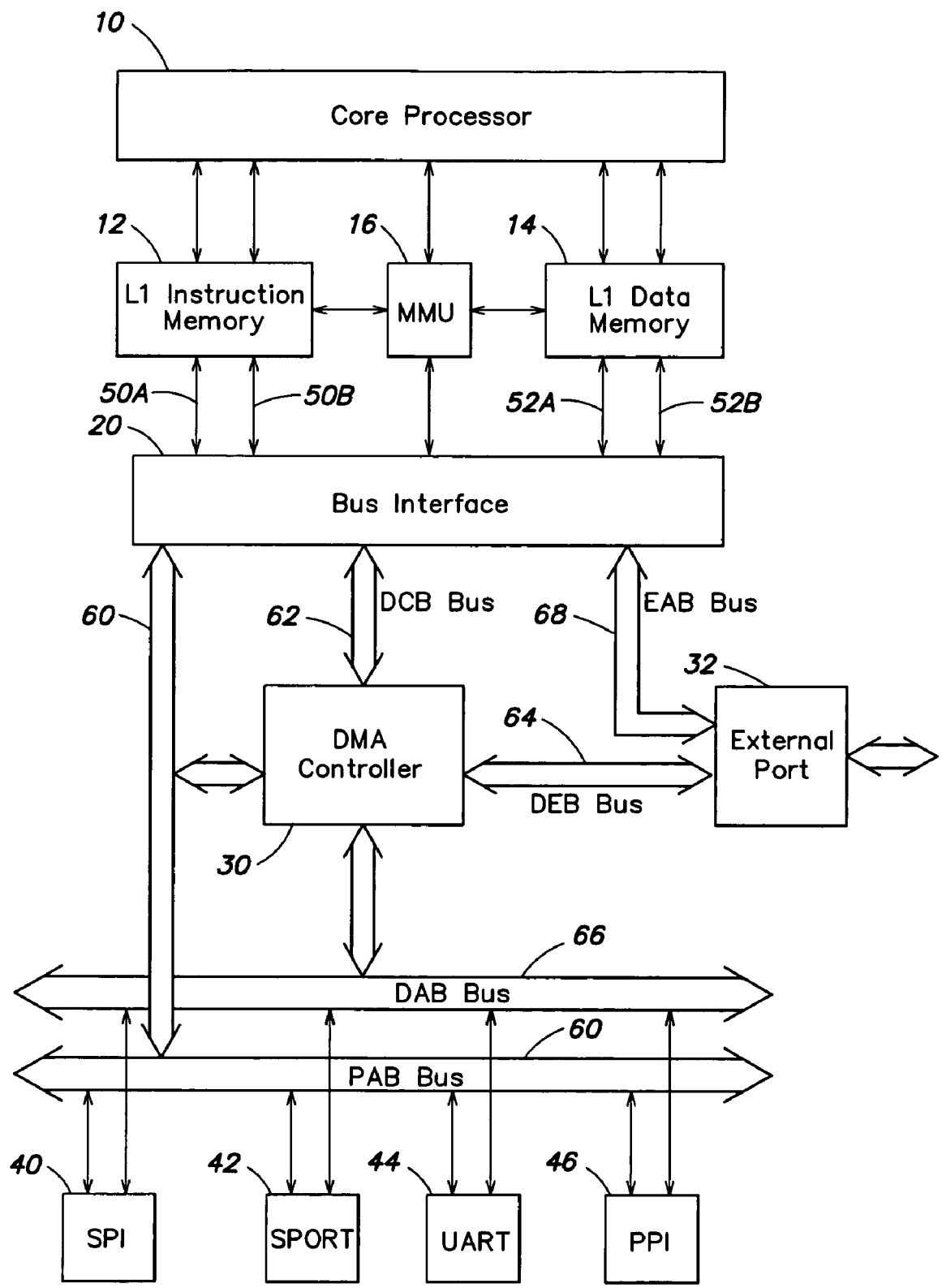
FIG. 1 is a block diagram of an embodiment of a digital signal processor.

A block diagram of a digital signal processor in accordance with an embodiment of the invention is shown in FIG. 1. The digital signal processor (DSP) includes a core processor 10, a level one (L1) instruction memory 12, an L1 data memory 14, a memory management unit (MMU) 16 and a bus interface unit 20. In some embodiments, L1 instruction memory 12 may be configured as RAM or as instruction cache and L1 data memory 14 may be configured as RAM or as data cache. The DSP further includes a DMA controller 30, an external port 32 and one or more peripheral ports. In the embodiment of FIG. 1, the DSP includes a serial peripheral interface (SPI) port 40, a serial port (SPORT) 42, a UART port 44 and a parallel peripheral interface (PPI) port 46. The digital signal processor may include additional peripheral ports and other components within the scope of the invention. For example, the digital signal processor may include an on-chip L2 memory.

Bus interface unit 20 is connected to L1 instruction memory 12 by buses 50A and 50B and is connected to L1 data memory 14 by buses 52A and 52B. A peripheral access bus (PAB) 60 interconnects bus interface unit 20, DMA controller 30 and peripheral ports 40, 42, 44 and 46. A DMA core bus (DCB) interconnects bus interface unit 20 and DMA controller 30. A DMA external bus (DEB) 64 interconnects DMA controller 30 and external port 32. A DMA access bus (DAB) 66 interconnects DMA controller 30 and peripheral ports 40, 42, 44 and 46. An external access bus (EAB) 68 interconnects bus interface unit 20 and external port 32.

Figure 2:
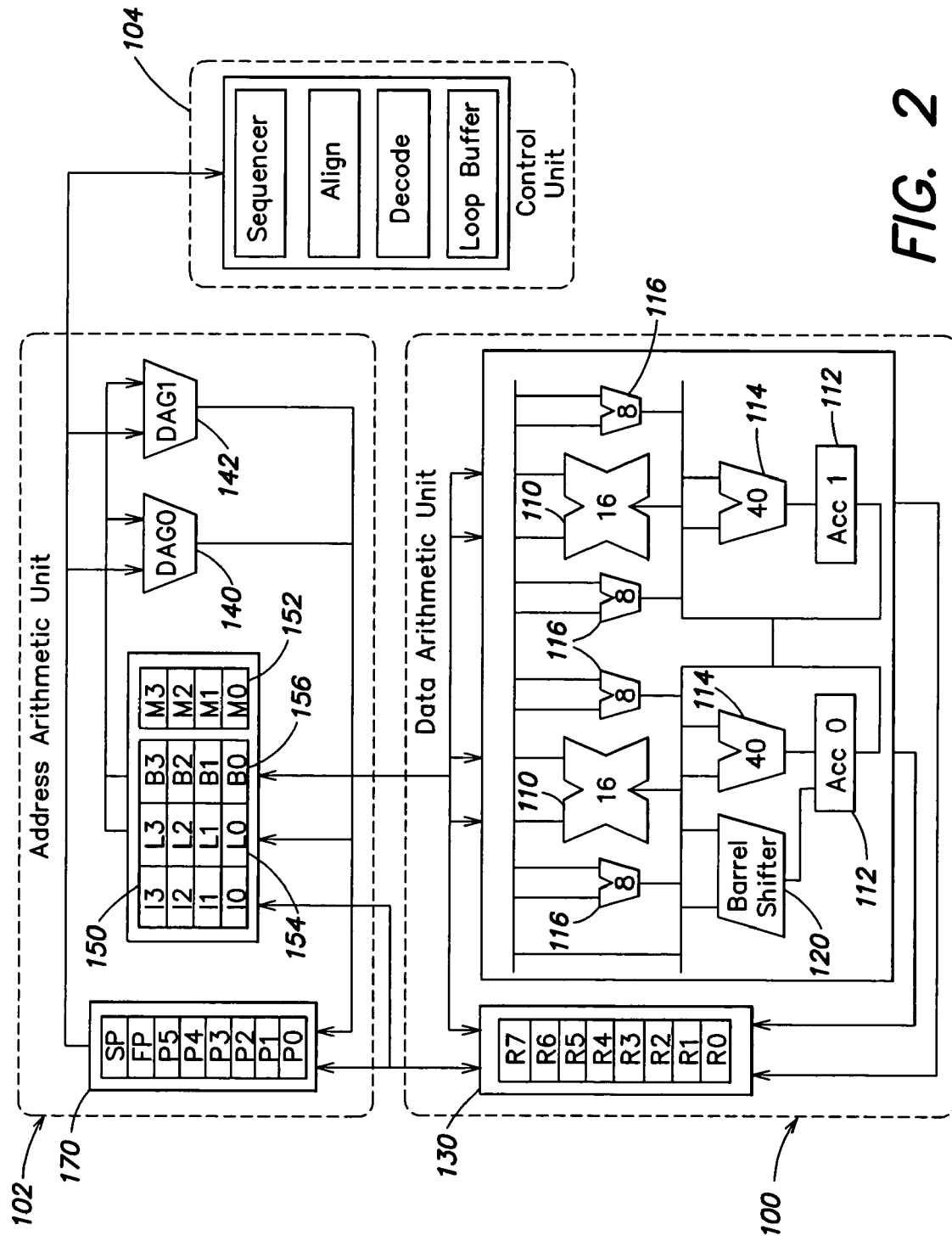
FIG. 2 is a block diagram of an embodiment of the core processor shown in FIG. 1.

A block diagram of an embodiment of core processor 10 is shown in FIG. 2. Core processor 10 includes a data arithmetic unit 100, an address unit 102 and a control unit 104. The data arithmetic unit 100 may include two 16-bit multipliers 110, two 40-bit accumulators 112, two 40-bit ALUs 114, four video ALUs 116 and a 40-bit shifter 120. The computation units process 8-bit, 16-bit, or 32-bit data from a register file 130 which may contain eight 32-bit registers. Control unit 104 controls the flow of instruction execution, including instruction alignment and decoding.

The address unit 102 includes address generators 140 and 142 for providing two addresses for simultaneous dual fetches from memory. Address unit 102 also includes a multiported register file including four sets of 32-bit index registers 150, modify registers 152, length registers 154, and base registers 156 and eight additional 32-bit pointer registers 170.

Figure 3:
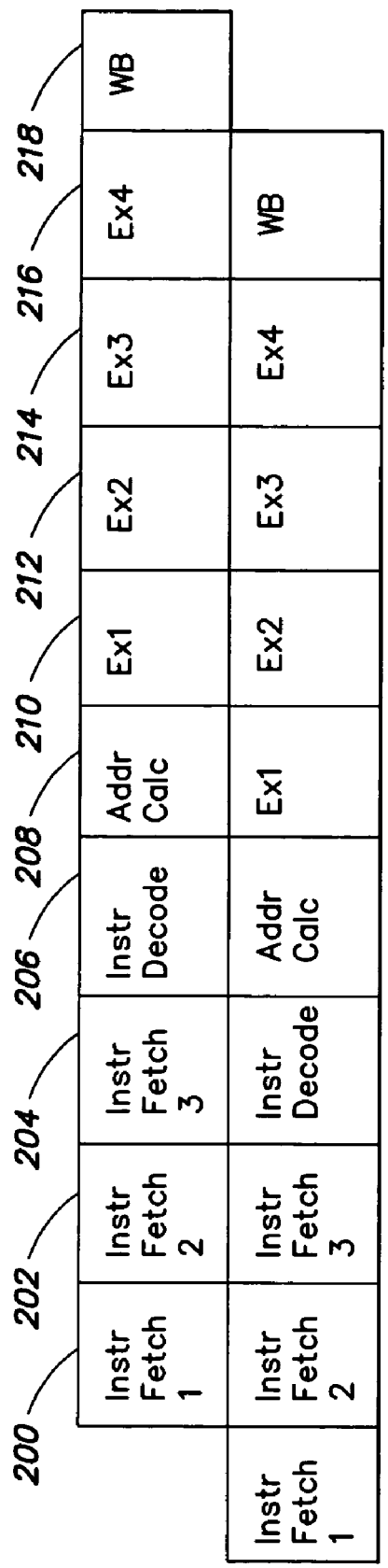
FIG. 3 is a pipeline diagram of the core processor in accordance with an embodiment of the invention.

An example of a pipelined processor suitable for implementation of the present invention is shown in FIG. 3. The processor pipeline includes instruction fetch stages 200, 202 and 204, instruction decode stage 206, address calculation stage 208, execution stages 210, 212, 214 and 216, and writeback stage 218. It will be understood that different processor architectures have different numbers of pipeline stages. In the embodiment of FIG. 3, the instruction address is sent to the fetch unit in instruction fetch stage 200, memory lookup is performed in instruction fetch stage 202, the instruction data is sent back to the processor in instruction fetch stage 204, and the instruction is available for decoding in instruction decode stage 206.

The address of the instruction in stage 200 may be called "PC_A". Similarly, the address of the instruction in stage 206 may be called "PC_D". Because of block fetching, we know address "PC_A" only at the beginning of an instruction stream (i.e. at a change of flow), but not in general during an instruction stream. Addresses PC_B and PC_C are also not known a priori. Address PC_D is always known at the beginning of cycle D by computing the previous address PC_D plus the instruction width of the instruction previously in stage 206.

In order to determine if the instruction in instruction fetch stage 204 is a loop bottom instruction, the following operations are performed.

Case I: If the instruction in stage 206 is a loop setup instruction, then if the loop bottom offset equals the width of the loop setup instruction, then the next instruction (the instruction in stage 204) is a loop bottom instruction. This can be done without any address comparison; we only need to decode the loop setup instruction.

Case II: If the instruction in stage 206 is not a loop setup instruction, then if LB is the loop bottom address, we compute:

$$PC\_C - LB == 0 \quad (1)$$

Address PC_C is not always known directly. In terms of known quantitites, the equation for the instruction address in stage 204 is:

$$PC\_C = PC\_D + IWIDTH\_D \quad (2)$$

where IWIDTH_D is the width of the instruction in decode stage 206. Substituting to again obtain "loop bottom in stage 204":

$$PC\_D + IWIDTH\_D - LB == 0 \quad (3)$$

The loop bottom address, LB, is computationally equivalent to the address of the last loop setup instruction PC_LSETUP plus the loop bottom offset BOT_OFFSET specified in the last loop setup instruction, or:

$$LB = PC\_LSETUP + BOT\_OFFSET \quad (4)$$

Substituting the value for loop bottom address LB, we get:

$$PC\_D + IWIDTH\_D - (PC\_LSETUP + BOT\_OFFSET) == 0 \quad (5)$$

$$PC\_D + IWIDTH\_D - PC\_LSETUP - BOT\_OFFSET == 0 \quad (6)$$

using the expression $-X = \sim X + 1$ (negative X equals X inverted plus one), we get:

$$PC\_D + IWIDTH\_D + \sim(PC\_LSETUP) + \sim(BOT\_OFFSET) + 2 == 0 \quad (7)$$

and $$PC\_D + IWIDTH\_D + \sim(PC\_LSETUP) + \sim(BOT\_OFFSET) + 1 == -1 \quad (8)$$

The quantity −1 in two's complement notation is a string of all ones. Bitwise, we can check to see that each bit of the result is a 1, otherwise the instruction in stage 204 is not a loop bottom instruction. This can be done without executing an add (with it's associated carry propagation), using the following method:

1) Using rows of full adders, or other similar reduction circuits, take the five inputs: PC_D, IWIDTH_D, ~(PC_LSETUP), ~(BOT_OFFSET), and +1 and generate two numbers (X and Y) which are equivalent when added. This can be accomplished using two rows of full adders (and a feedforward path of 2 gate delays).

2) Perform an exclusive or (XOR) of each bit of X with it's corresponding bit of Y, and then AND together all the resulting bits to compute if the instruction is a loop bottom instruction.

The result of Case I and Case II are muxed together (depending on whether the instruction in stage 206 is a loop setup instruction) to determine if there is a loop bottom instruction in stage 206.

Figure 4:
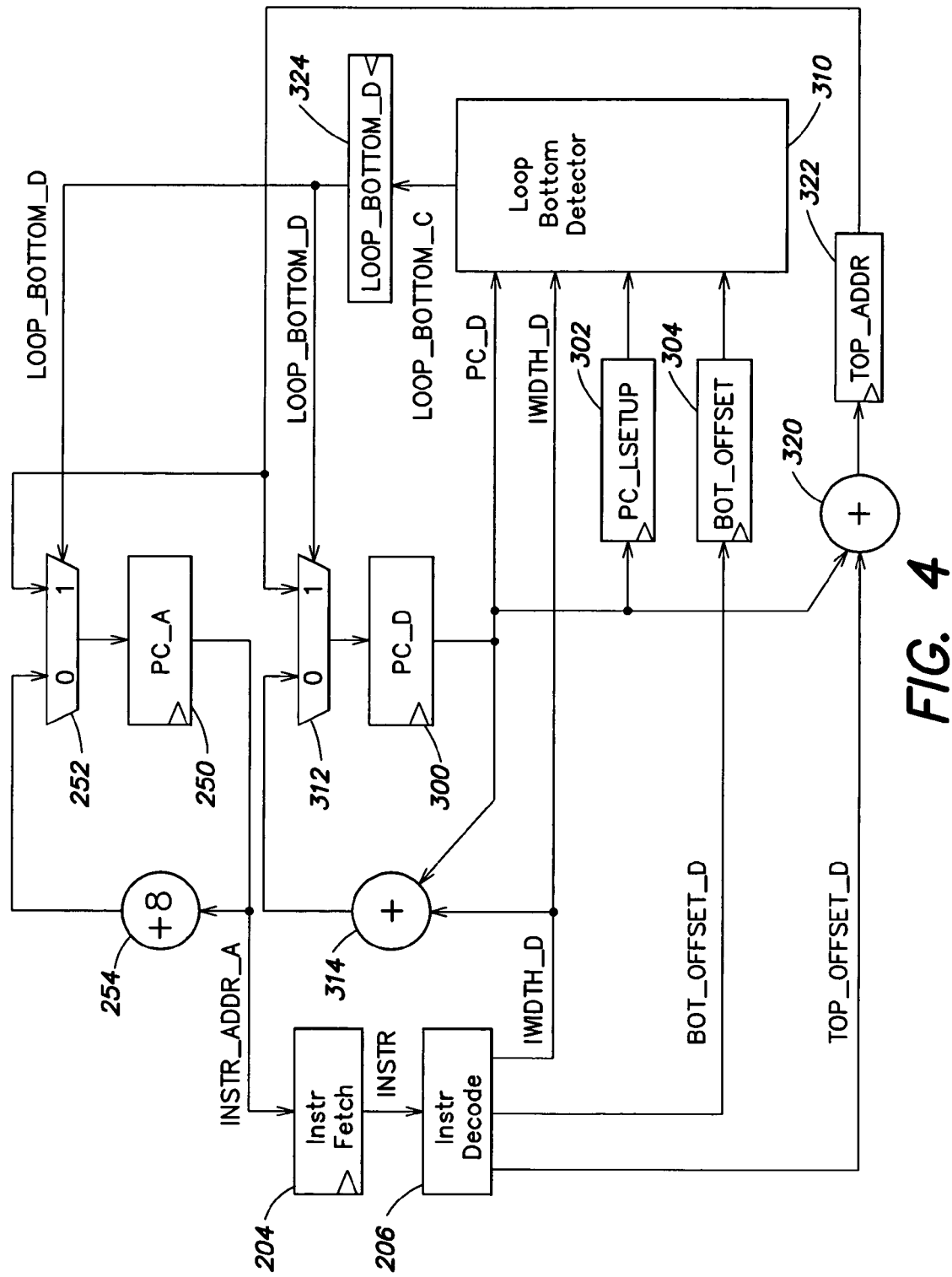
FIG. 4 is a block diagram of apparatus for loop bottom detection in accordance with an embodiment of the invention.

A block diagram of apparatus for loop bottom detection in accordance with an embodiment of the invention is shown in FIG. 4. A register 250 holds the instruction address PC_A of an instruction to be fetched. Register 250 receives the instruction address from a multiplexer 252. Multiplexer 252 receives a first input from an adder 254 which increments the address in register 250 by eight and receives a second input from a loop top address register 322. Multiplexer 252 is controlled by a loop bottom signal. When the loop bottom is detected, the loop top address is loaded into register 250. The instruction address is output from register 250 to instruction fetch stage 204. The instruction fetched by stage 204 is supplied to instruction decode stage 206.

A register 300 holds the instruction address PC_D of the instruction in instruction decode stage 206. Instruction address register 300 receives an address from a multiplexer 312. Multiplexer 312 receives a first input from an adder 314 and a second input from loop top address register 322. Adder 314 sums the instruction address in register 300 and the instruction width IWIDTH_D from instruction decode stage 206 to provide the next instruction address. Multiplexer 312 is controlled by the loop bottom signal. Thus, when the loop bottom is detected, the loop top address is loaded into register 300.

When a loop setup instruction is decoded, the address of the loop setup instruction, PC_LSETUP, is stored in a register 302 and the offset to the loop bottom instruction, BOT_OFFSET, is stored in a register 304. The loop top offset value is supplied to an adder 320. The loop bottom offset and the loop top offset are obtained by decoding the loop setup instruction. Adder 320 sums the loop top offset and the loop setup instruction address to obtain a loop top address which is stored in register 322.

Instructions following the loop setup instruction are then decoded. The corresponding instruction address, PC_D, and the instruction width, IWIDTH_D, are supplied to a loop bottom detector 310. The instruction width is obtained by decoding the instruction. Loop bottom detector 310 also receives the loop setup address PC_LSETUP and the loop bottom offset BOT_OFFSET from registers 302 and 304, respectively. Loop bottom detector 310 uses the current instruction address, the current instruction width, the loop setup instruction address and the loop bottom offset to determine if a next instruction in instruction fetch stage 204 is a loop bottom instruction. Loop bottom detector 310 utilizes the method described above. The output of loop bottom detector 310 is supplied to a loop bottom register 324, and the loop bottom signal is supplied from loop bottom register 324 to the control input of multiplexer 252 and to the control input of multiplexer 312. When a loop bottom instruction is detected, the processor branches to the loop top instruction.

Figure 5:
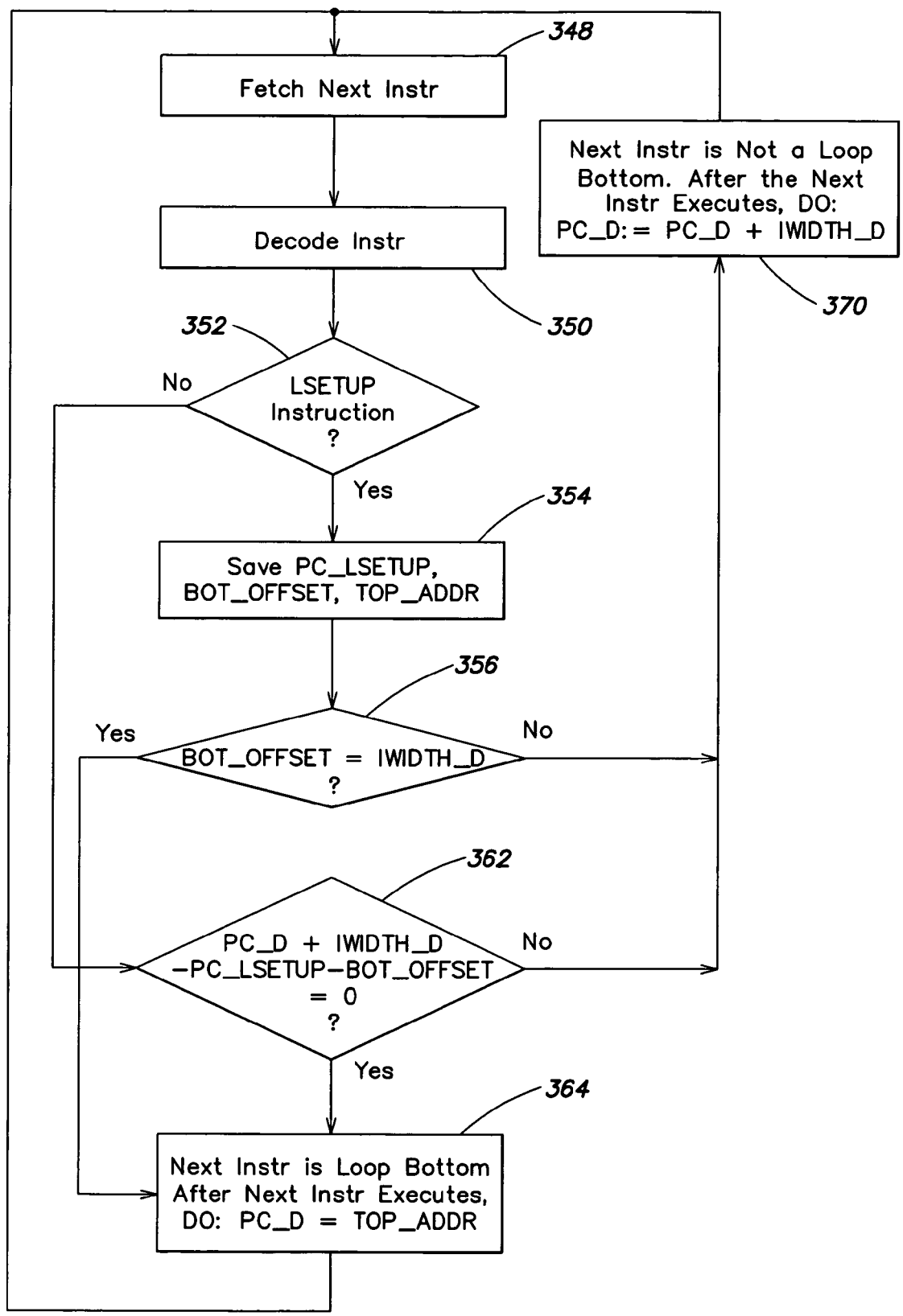
FIG. 5 is a flow chart of a process for loop bottom detection in accordance with an embodiment of the invention.

A process executed by the apparatus of FIG. 4 for early detection of loop bottom instructions in accordance with an embodiment of the invention is shown in FIG. 5. In step 348, the next instruction is fetched. In step 350, an instruction is decoded by decode stage 206 (FIG. 4). In step 352, a determination is made as to whether the decoded instruction is a loop setup instruction. If the decoded instruction is determined in step 352 to be a loop setup instruction, the address of the loop setup instruction PC_LSETUP, the loop bottom offset BOT_OFFSET and the loop top address TOP_ADDR are saved in registers 302, 304 and 322, respectively, in step 354.

In step 356, a determination is made as to whether the loop bottom offset BOT_OFFSET is equal to the width IWIDTH_D of the loop setup instruction. If these quantities are determined in step 356 to be equal, the next instruction following the loop setup instruction is a loop bottom instruction (Case I above) and the process proceeds to step 364. If these quantities are determined in step 356 not to be equal, the process proceeds to step 370.

If the instruction is determined in step 352 not to be a loop setup instruction, the process proceeds to step 362. The instruction has an instruction address PC_D and is decoded to determine the instruction width IWIDTH_D. In step 362, the current instruction address, the current instruction width, the loop setup instruction address and the loop bottom offset are used to determine if the next instruction, i.e. the instruction in instruction fetch stage 204, is a loop bottom instruction. In particular, step 362 may involve determining if the current instruction address plus the current instruction width minus the loop setup instruction address minus the loop bottom offset is equal to zero. If this condition is met, the next instruction is identified as a loop bottom instruction in step 364. This causes the program sequencer to branch to the loop top instruction for continuous execution of the program loop, or to exit the loop if the required number of loop iterations has been completed. The required number of loop iterations is specified by the loop count value in the loop setup instruction. Thus, after the next instruction (the loop bottom instruction) executes, the loop top address is loaded into register 300 in step 364.

If a loop bottom instruction is not identified in step 362, the process proceeds to step 370. Step 370 is the case where the next instruction is not a loop bottom instruction. After the next instruction executes, the output of adder 314, which represents the instruction address plus the instruction width, is loaded into instruction address register 300. The process then proceeds to step 348 for fetching of the next instruction in the instruction sequence.

Figure 6:
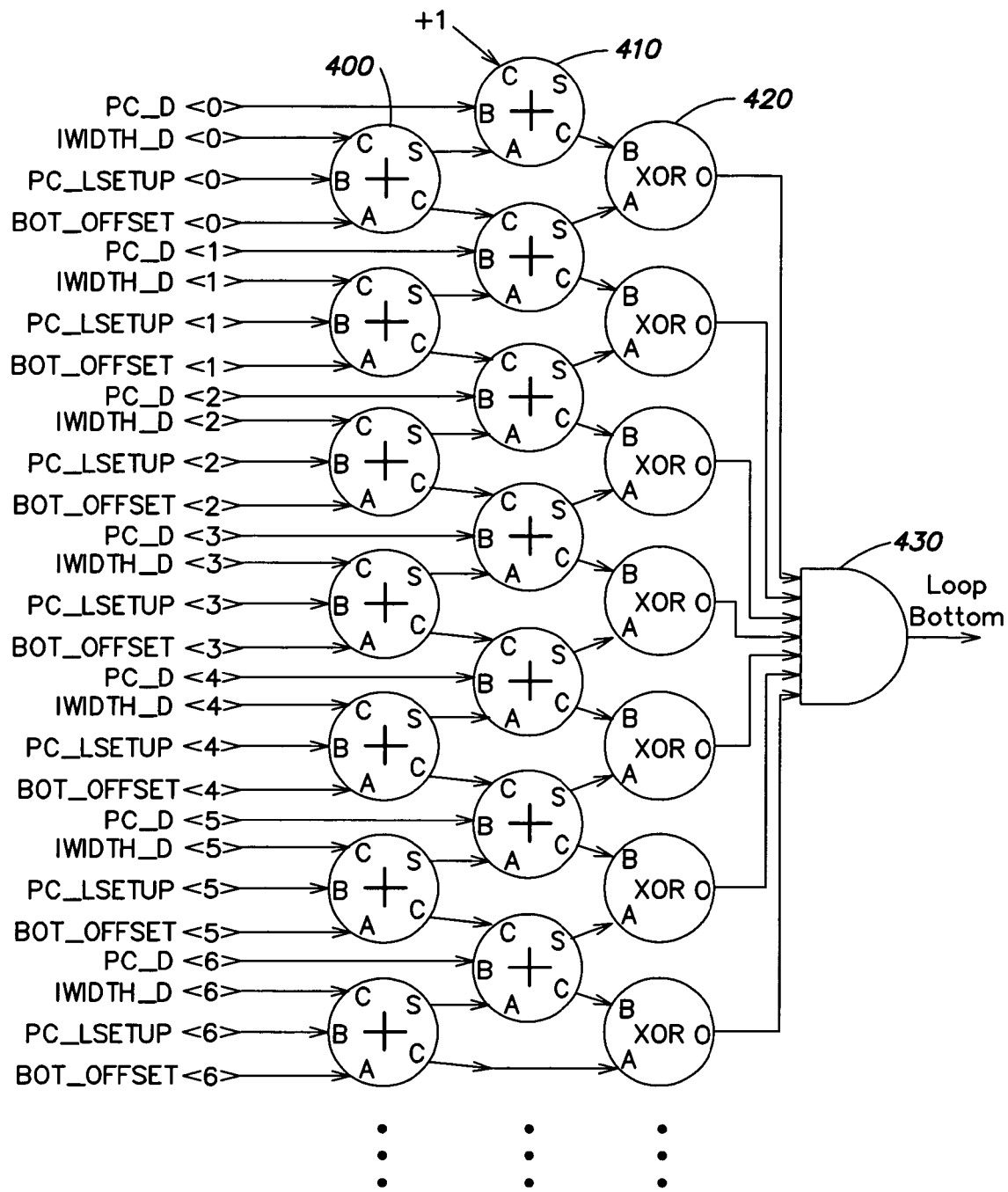
FIG. 6 is a block diagram of a loop bottom detector in accordance with an embodiment of the invention.

It will be understood that the computation utilized to determine if the next instruction is a loop bottom instruction may be implemented in various ways within the scope of the present invention. An efficient implementation is described below with reference to FIG. 6. FIG. 6 is a block diagram of loop bottom detector 310 (FIG. 4) in accordance with an embodiment of the invention. The loop bottom detector of FIG. 6 implements equation (8) above. The loop bottom detector includes a first row of full adders 400, a second row of full adders 410, a row of exclusive OR gates 420 and an AND gate 430. Adders 400 in the first row receive respective bits of the current instruction width IWIDTH_D, the loop setup instruction address PC_LSETUP and the loop bottom offset BOT_OFFSET. The sum and carry outputs of adders 400 are supplied to inputs of adders 410 in the second row. Adders 410 in the second row also receive the bits of the current instruction address PC_D, and the lowest order adder 410 receives a value of +1. The sum and carry outputs of adders 410 are supplied to respective inputs of exclusive OR gates 420, and the outputs of exclusive OR gates 420 are supplied to inputs of AND gate 430. As described above, the loop bottom detector determines if each bit of the result in equation (8) is a 1. In this case, AND gate 430 outputs a signal indicating that the next instruction is a loop bottom instruction.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for processing variable width instructions in a pipelined processor, comprising:
   decoding instructions to identify a loop setup instruction having a loop setup instruction address to determine a loop top offset indicative of a loop top instruction address of a loop top instruction and a loop bottom offset indicative of a loop bottom instruction address of a loop bottom instruction;
   decoding variable width instructions following the loop setup instruction to detect the loop bottom instruction, a width of each of the variable width instructions being determined during decoding;
   decoding a current instruction of the variable width instructions, the current instruction having a current instruction address and a current instruction width;
   fetching a next instruction of the variable width instructions;
   determining if the next instruction to be decoded is the loop bottom instruction based, at least in part, on the current instruction address, the current instruction width, the loop setup instruction address and the loop bottom offset, the determination being made prior to decoding the next instruction; and
   providing the loop top instruction address to an instruction fetch stage of the pipelined processor if it is determined that the next instruction is the loop bottom instruction.

2. A method as defined in claim 1, wherein determining if the next instruction is a loop bottom instruction comprises determining if the current instruction address plus the current instruction width minus the loop setup instruction address minus the loop bottom offset is equal to zero.

3. A method for processing variable width instructions in a pipelined processor, comprising:
   decoding instructions to identify a loop setup instruction having a loop setup instruction address and containing a loop bottom offset;
   decoding instructions following the loop setup instruction, each having an instruction address and containing an instruction width;
   for each instruction following the loop setup instruction, using a current instruction address, a current instruction width, the loop setup instruction address and the loop bottom offset to determine if the next instruction is a loop bottom instruction, wherein determining if the next instruction is a loop bottom instruction comprises determining if the current instruction address plus the current instruction width plus the loop setup instruction address inverted plus the loop bottom offset inverted plus 1 is equal to negative 1; and
   changing a state of a loop bottom register if it is determined that the next instruction is the loop bottom instruction to indicate to the pipelined processor that a loop top instruction should be fetched.

4. A method as defined in claim 3, wherein the step of determining if the next instruction is a loop bottom instruction is performed by a plurality of adders, a plurality of exclusive OR gates receiving outputs of the adders and an AND gate receiving outputs of the exclusive OR gates.

5. A method as defined in claim 1, further comprising identifying a next instruction following the loop setup instruction as a loop bottom instruction if the loop bottom offset is equal to a width of the loop setup instruction.

6. Apparatus for processing variable width instructions in a pipeline processor, comprising:
   an instruction decoder configured to decode a loop setup instruction, having a loop setup instruction address, to obtain a loop top offset indicative of a loop top instruction address of a loop top instruction and a loop bottom offset indicative of a loop bottom instruction address of a loop bottom instruction and configured to decode variable width instructions following the loop setup instruction to determine an instruction width of each of the variable width instructions;
   an instruction fetch stage configured to fetch instructions to be decoded by the instruction decoder;
   registers for holding the loop setup instruction address and the loop bottom offset, respectively; and a loop bottom detector configured to determine if a next instruction to be decoded and currently in the instruction fetch stage is the loop bottom instruction prior to decoding the next instruction, the determination based, at least in part, on a current instruction address and current instruction width of a current instruction being decoded by the instruction decoder, the loop bottom detector configured to provide the loop top instruction to the instruction fetch stage if the loop bottom detector determines the next instruction is the loop bottom instruction.

7. Apparatus for processing variable width instructions in a pipeline processor, comprising:

an instruction decoder configured to decode a loop setup instruction, having a loop setup instruction address, to obtain a loop bottom offset and configured to decode instructions following the loop setup instruction, each having an instruction address, to obtain an instruction width;

registers for holding the loop setup instruction address and the loop bottom offset;

a loop bottom register for holding a state indicative of whether a loop bottom instruction has been detected; and a loop bottom detector, responsive to a current instruction address, a current instruction width, the loop setup instruction address and the loop bottom offset, configured to determine if a next instruction is a loop bottom instruction, wherein the loop bottom detector is configured to determine if the current instruction address plus the current instruction width plus the loop setup instruction address inverted plus the loop bottom offset inverted plus one is equal to negative one, and wherein the loop bottom detector is configured to change the state of the loop bottom register if it is determined that the next instruction is the loop bottom instruction.

8. Apparatus as defined in claim 7, wherein the loop bottom detector comprises a plurality of adders receiving the current instruction address, the current instruction width, the loop setup instruction address inverted, the loop bottom offset inverted and one, a plurality of exclusive OR gates receiving outputs of the adders and an AND gate receiving outputs of the exclusive OR gates to provide a loop bottom indication.

9. Apparatus for processing variable width instructions in a pipelined processor, comprising:

means for decoding a loop setup instruction, having a loop setup instruction address, to obtain a loop top offset indicative of a loop top instruction address of a loop top instruction and a loop bottom offset indicative of a loop bottom instruction address of a loop bottom instruction and for decoding variable width instructions following the loop setup instruction to determine an instruction width of each of the variable width instructions;

means for fetching instructions to be decoded by the means for decoding;

means for holding the loop setup instruction address and the loop bottom offset; and means for determining if a next instruction to be decoded is the loop bottom instruction prior to decoding the next instruction, the determination based, at least in part, on a current instruction address and current instruction width of a current instruction being decoded by the means for decoding, and configured to provide the loop top instruction to the means for fetching instructions if the next instruction is determined to be the loop bottom instruction.

10. Apparatus as defined in claim 9, wherein the means for determining if a next instruction is a loop bottom instruction comprises means for determining if the current instruction address plus the current instruction width minus the loop setup instruction address minus the loop bottom offset is equal to zero.

11. Apparatus for processing variable width instructions in a pipelined processor, comprising:

means for decoding a loop setup instruction, having a loop setup instruction address, to obtain a loop bottom offset and for decoding instructions following the loop setup instruction, each having an instruction address, to obtain an instruction width;

means for holding the loop setup instruction address and the loop bottom offset; means, responsive to a current instruction address, a current instruction width, the loop setup instruction address and the loop bottom offset, for determining if a next instruction is a loop bottom instruction, wherein the means for determining if a next instruction is a loop bottom instruction comprises means for determining if the current instruction address plus the current instruction width plus the loop setup instruction address inverted plus the loop bottom offset inverted plus one is equal to negative 1; and means for changing a state of a loop bottom register when it is determined that the next instruction is the loop bottom instruction.

12. Apparatus as defined in claim 11, wherein the means for determining if the next instruction is a loop bottom instruction comprises a plurality of adders, a plurality of exclusive OR gates receiving outputs of the adders and an AND gate receiving outputs of the exclusive OR gates.

* * * * *